Figure 1:
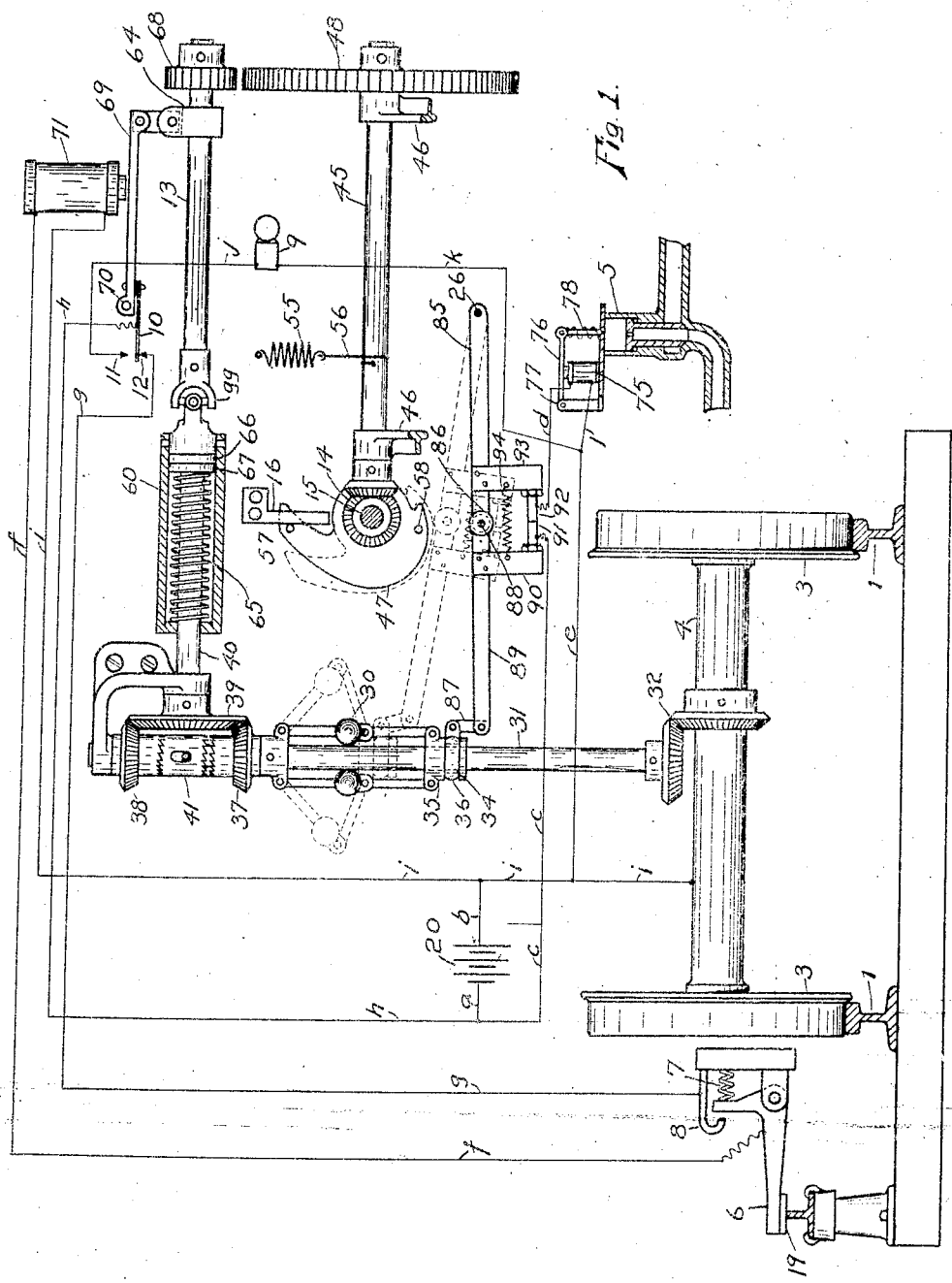

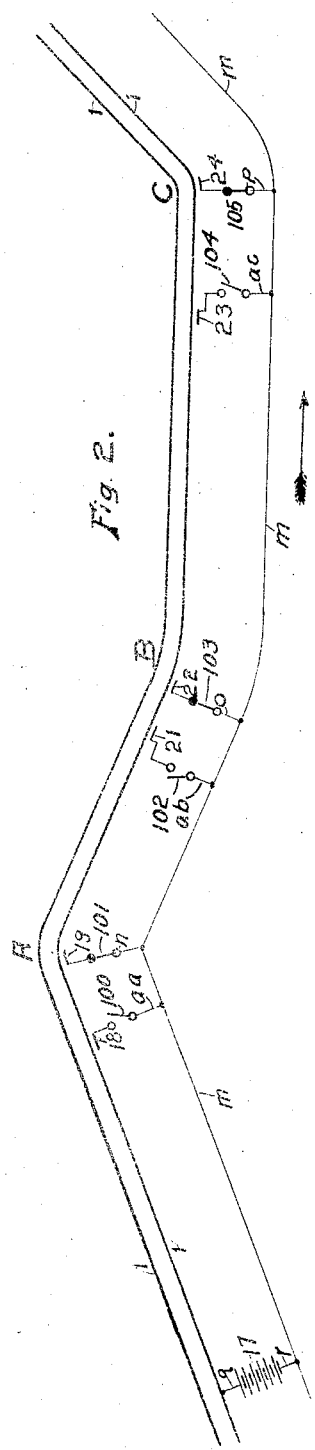
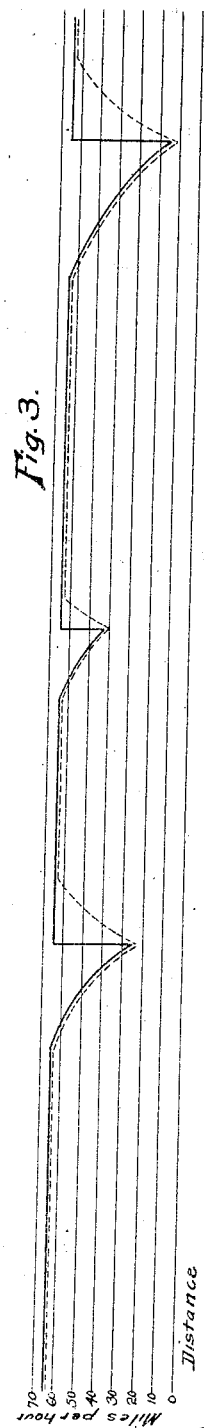

UNITED STATES PATENT OFFICE.

PAUL J. SIMMEN, OF BUFFALO, NEW YORK.

SPEED-CONTROL DEVICE FOR MOVING VEHICLES.

1,391,420.

Specification of Letters Patent.  Patented Sept. 20, 1921.

Application filed May 1, 1917. Serial No. 165,663.

*To all whom it may concern:*

Be it known that I, PAUL J. SIMMEN, a citizen of the United States, residing at Buffalo, in the county of Erie and State of New York, have invented certain new and useful Improvements in Speed-Control Devices for Moving Vehicles, of which the following is a specification.

This invention relates to an apparatus for automatically controlling the speed of a vehicle moving along a railway, and its novelty consists in the construction and adaptation of the parts as will be more fully hereinafter pointed out.

In Letters Patent of the United States No. 1,150,308 issued August 17th, 1915, and in another Patent No. 1,150,309 issued August 17th, 1915, I have described an automatic apparatus for controlling the speed of a moving vehicle, which in brief comprises a device moving in accordance with the actual speed of the vehicle, another device moving in accordance with a permissible speed, together with means whereby, when the actual speed exceeds the permissible speed, retarding mechanism, with which the vehicle is equipped, is set into operation to reduce its speed, or ultimately to stop the vehicle. The device moving in accordance with a permissible speed is so actuated, that in moving from the maximum speed to the minimum speed, a speed distance curve is generated, which corresponds to the well known braking curve derived from experimental data.

The subject matter of the present application is specifically to provide for moving the permissible speed device to various intermediate or submaximum positions so that it will be impossible for the train to exceed any predetermined speed limit around a dangerous curve. It will be clear that in addition to reducing the speed at dangerous curves, it will be possible to limit the speed of the train at any dangerous point in the trackway made dangerous by an outside hazard.

In the drawings there is illustrated a preferred form of apparatus embodying my invention, the parts being shown largely in diagram for the sake of promoting clearness in the description, and the position of the parts being that assumed when the vehicle carried shoe is in contact with an energized signal rail, and the permissible speed indicating shaft and cam have been brought to a maximum position. The dotted outline of the cam 47 shows it in a submaximum position, while the dotted outline of the governor 30 and its coöperating parts indicate the vehicle moving at a higher rate of speed than that indicated in the full line drawing.

In Figure 1 there is shown a diagram of the vehicle carried devices.

Fig. 2 shows in diagram a trackway on which are located the highway control apparatus for actuating the vehicle carried devices.

And, Fig. 3 shows a speed distance diagram.

In the following description the electrical conductors connecting the different parts are designated by the lower case letters of the alphabet.

In Fig. 1 there is shown the car equipment. In this figure, 1, 1 indicate the track rails, 3, 3 are the wheels of the vehicle, 4 is its axle, and the ordinary train pipe air valve controlling the brake system is generally indicated at 5. 6 is a shoe hingedly mounted at a convenient place on the vehicle and adapted to contact with suitable signal rails, such as 19. During such contact with a signal rail, the shoe breaks contact with its contact point 8, and after leaving such signal rail is restored by the compression spring 7 and gravity to its contact point. 20 is a local battery mounted on the vehicle, and 9 is an electric bell or audible signal.

Also mounted on the vehicle is a centrifugal governor 30 moved by a shaft 31 and a gear 32 on the wheel axle 4. On the ball frame of the governor is a sleeve 35 slidably mounted on the shaft 31 and having a groove 34. In the groove 34 of the sleeve 35 is rotatably mounted the collar 36. At its upper end the shaft 31 is provided with gears 37 and 38, each adapted to mesh with a gear 39 on a shaft 40. Between the gears 37 and 38 is a sleeve 41 slidable on the shaft and indented at both ends to engage similarly indented annular flanges on the gears 37 and 38, but which indentations run in opposite directions, whereby the shaft 40 is always rotated in the same direction, no matter in which direction the shaft 31 is rotated.

A shaft 45 is mounted in suitable bearings 46 and at one end is provided with a bevel gear 14, and at its opposite end with a gear 48. The bevel gear 14 meshes with a similar bevel gear 14 carried by the shaft 15, which shaft is also provided with a speed control cam 47. A spring 55 and a cord 56 serve to retract the shaft 45 and the speed control cam 47 to their original position after rotation and release. Detent 16 is mounted in the path of the pins 57 and 58, which are rigidly attached to the cam 47, and said detent thus serves to limit the extent of the movement of the cam 47. The shaft 45 is moved from the shaft 40 by means of a power transmitting mechanism including a friction clutch indicated at 60, a shaft 13 supported upon and carried by a bearing 64, and connected to the shaft 40 by a universal joint 99 and a pinion 68 adapted to mesh with the gear 48. The clutch 60 comprises two disks 66 and 67 pressed together by a spring 65 and so arranged that they slip when undue torsional strain is brought upon the shaft. The bearing 64 is suspended from an arm 69 swung upon a pivot 70, the arm 69 being the armature of an electromagnet 71. Rigidly attached to and insulated from the arm 69 is the contact member 10, which is adapted, when the magnet 71 is energized, to touch the contact 12, and when the magnet 71 is deënergized, to touch the contact 11.

Adjacent to the train air pipe valve indicated at 5 is a relay 75 having an armature 76 pivoted at 77 and adapted to compress a spring 78, normally adapted to hold open the valve 5, which is a valve, such as is well known in the art for permitting the air in the train line to exhaust to the atmosphere, and thus apply the brakes when the coil 75 is deënergized.

Hingedly mounted at 26 and adjacent to the cam 47 is an arm 85 carrying a roller 86 adapted to contact with said cam. Hingedly attached to the arm 85 at 88 is another arm 89, whose other end is connected with the collar 36 by the link 87. Rigidly attached to the arm 85 is a supplemental arm 93 made of insulating material and carrying a contact 92. Rigidly attached to the arm 89 is a supplemental arm 90 made of insulating material and carrying a contact member 91. Contact members 91 and 92 are normally adapted to touch, and such contact is promoted by the tension spring 94.

In Fig. 2 the track equipment is shown. In this figure, 1, 1 indicate the track rails along which the vehicle is adapted to travel. 17 is a track battery, one terminal of which is connected to the track rails 1, 1 by the wire $g$, and the other terminal of which is connected to a line wire $m$ by the wire $r$. 18, 21 and 23 are signal rails which are normally deënergized, it being possible to energize them if desired by closing the switches 100, 102, 104 which respectively connect the signal rails 18, 21, 23 with the line wire $m$, by means of the wires $aa$, $ab$, and $ac$ respectively. 19, 22 and 24 are signal rails, which are normally energized from the line wire $m$ and battery 17 through the wires $n$, $o$ and $p$ respectively. The signal rails 19, 22 and 24 may be deënergized if desired by opening the switches 101, 103 and 105 which are included in the wires $n$, $o$ and $p$ respectively.

Let it be assumed that the shoe 6 has been moved into contact with energized signal rail 19, and has been lifted to break the connection between the shoe and the contact 8. With the rail 19 energized the magnet 71 becomes energized through the following circuit:—from the battery 17 to the wire $r$, wire $m$, wire $n$, signal rail 19, shoe 6, wire $f$, magnet 71, wire $i$, axle 4, track rails 1, 1 and wire $q$ to the battery 17. When the vehicle leaves the energized signal rail 19, the shoe 6 is restored to contact with the contact 8 and the magnet 71 remains energized through the following holding circuit:—from the positive side of the battery 20 to the wire $a$, wire $h$, contact member 10, contact 12, wire $g$, contact 8, shoe 6, wire $f$, magnet 71, wire $i$, and wire $b$ to the negative side of the battery 20.

Now let it be assumed that the shoe 6 has been moved into contact with the deënergized signal rail 18 and has been lifted to break the connection between such shoe and its contact 8. The holding circuit of the magnet 71 will be broken at the contact 8, the magnet 71 will become deënergized and the audible danger signal 9 will be actuated through the following circuit:—from the positive side of the battery 20 to the wire $a$, wire $h$, contact member 10, contact 11, wire $j$, bell 9, wire $k$, wire $e$, wire $i$, and wire $b$ to the negative side of the battery 20. When the vehicle leaves the deënergized signal rail 18, the magnet 71 will continue to be deënergized, its holding circuit now being broken at contact 12. The audible danger signal 9 will continue to ring through the circuit previously described.

When the contacts 91 and 92 are in contact the following circuit is established:— from the positive side of the battery 20 to the wire $a$, wire $c$, contact 91, contact 92, wire $d$, relay coil 75, wire 1, wire $e$, wire $i$, and wire $b$ to the negative side of the battery 20. But when the contacts 91 and 92 are forced apart or are not in contact, the coil 75 will be deënergized, and the spring 78 will open the valve 5 and the air brakes will be applied.

The operation of this device is as follows:

Whenever the magnet 71 is energized, the pinion 68 is out of mesh with the gear 48, and the cam 47 is held in its maximum position, by the spring 55. Whenever the magnet 71 is deënergized the pinion 68 is dropped into mesh with the gear 48 and the cam 47 is driven from its maximum position toward its minimum position due to the movement of the vehicle. If the speed of the vehicle at any time is in excess of its permissible speed as indicated by the position of the cam 47, the contacts 91 and 92 will be forced apart (as shown by dotted line in Fig. 1) and the air brakes will be applied.

Reference to Figs. 2 and 3 will bring out clearly the practical application of this device. Let it be assumed that at a point A in the trackway there is a curve which requires a speed of 25 miles per hour. At a suitable distance in the rear of the curve there is placed a normally deënergized signal rail 18, which will start the cam 47 in operation. The signal rail 18 is placed at such a distance from the curve A that the permissible speed upon entering the curve will be 25 miles per hour. At the beginning of the curve there is placed the energized rail 19 to restore the cam 47 to its maximum position. At point B on the trackway is shown a curve requiring a speed reduction to 45 miles per hour, and at point C is shown a curve requiring a speed reduction to 15 miles per hour. The same method is used at points B and C to secure the proper speed reduction as was used at point A, the distance in each case between the deënergized signal rail and the energized signal rail being determined by the speed reduction required. This is clearly brought out by the speed distance diagram in Fig. 3 where the heavy line shows the permissible speed as determined by the movements of the cam, and where the dotted line shows the actual speed of the train where the engineer maintained his speed slightly below the permissible speed.

It will be obvious that if any of the normally energized signal rails are deënergized, the cam 47 will continue its movement until it reaches its minimum position, in which position it will remain until an energized signal rail is reached. This will require the engineer to keep the speed of his train below the adopted minimum. If any of the normally deënergized signal rails are energized, the cam 47 will remain in its maximum position and the train will be limited only to its maximum speed.

It will be understood that while the above description of the practical operation of this device shows its application for reducing speed on dangerous curves, the device may be applied to reduce the speed to the proper limits for any conditions in the trackway which require limited speeds, such, for example—as grade crossings, dangerous grades, trestles and points where the track is in bad condition.

I claim:

1. In a railway automatic vehicle speed control, in combination; a trackway having sections necessitating limited vehicle speeds under clear conditions; a vehicle for movement thereon; means partly along the trackway and partly on the vehicle whereby the speed of the vehicle is limited at said sections, the means on the trackway including a normally deënergized ramp followed by a normally energized ramp spaced apart a distance corresponding to the necessary limited vehicle speed.

2. In a railway automatic vehicle speed control, in combination; a trackway having sections necessitating limited vehicle speeds under clear conditions; a vehicle for movement thereon; means partly along the trackway and partly on the vehicle whereby the speed of the vehicle is limited at said sections, the means on the trackway including ramp members spaced apart a distance corresponding to the necessary limited vehicle speed, one of said ramp members being deënergized and the other energized.

3. In a railway automatic train speed control, in combination; a trackway; a device on the vehicle moved in accordance with the actual speed thereof; another device on the vehicle having an initial maximum condition and an ultimate minimum condition and moved after release by the movement of the vehicle in accordance with the permissible speed thereof; means governed by the conjoint action of the said devices whereby the speed of the vehicle is governed; means along the trackway for releasing the second device and being normally active to release; means along the trackway for restoring the second device to maximum condition, the last two mentioned means being positioned a distance apart longitudinally of the trackway such that any desired movement of the second mentioned device from maximum to minimum will be caused before restoration of the second mentioned device to maximum.

4. In a railway automatic train speed control, in combination; a trackway; a vehicle for movement thereon; means on the vehicle for controlling the speed thereof and means on the trackway for governing the vehicle controlling means, the means on the trackway including two ramp members spaced longitudinally of the trackway a distance apart corresponding to the control desired, one of said ramp members being deënergized and the other energized.

5. In a railway automatic train speed control, in combination; a trackway; a vehicle for movement thereon; means on the vehicle for causing a gradual reduction in speed of the vehicle and means, including spaced members on the trackway, one of which is deënergized and the other of which is energized for causing any desired amount of reduction in speed of the vehicle, the amount being determined by varied spacing of the members longitudinally of the trackway.

In testimony whereof I affix my signature in presence of two witnesses.

PAUL J. SIMMEN.

Witnesses:
C. E. CHATFIELD,
ANNA C. PERS.